(12) United States Patent
Ezoe

(10) Patent No.: US 10,565,111 B2
(45) Date of Patent: Feb. 18, 2020

(54) PROCESSOR

(71) Applicant: NEC Corporation, Minato-ku, Tokyo (JP)

(72) Inventor: Kenji Ezoe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/893,918

(22) Filed: Feb. 12, 2018

(65) Prior Publication Data

US 2018/0276125 A1   Sep. 27, 2018

(30) Foreign Application Priority Data

Mar. 27, 2017  (JP) ................... 2017-061109

(51) Int. Cl.
*G06F 12/0811* (2016.01)
*G06F 12/0815* (2016.01)
*G06F 12/0897* (2016.01)

(52) U.S. Cl.
CPC ...... *G06F 12/0815* (2013.01); *G06F 12/0811* (2013.01); *G06F 12/0897* (2013.01); *G06F 2212/1016* (2013.01); *G06F 2212/1056* (2013.01)

(58) Field of Classification Search
CPC ............. G06F 12/0815; G06F 12/0811; G06F 12/0897; G06F 2212/1056; G06F 2212/1016
See application file for complete search history.

(56) References Cited

U.S. PATENT DOCUMENTS

| | | | | |
|---|---|---|---|---|
| 5,564,035 | A | * | 10/1996 | Lai ...................... G06F 12/0897 711/122 |
| 5,579,473 | A | * | 11/1996 | Schlapp .............. G06F 12/0897 345/535 |
| 6,138,208 | A | | 10/2000 | Dhong et al. |
| 6,574,710 | B1 | | 6/2003 | Gaither et al. |
| 6,812,929 | B2 | * | 11/2004 | Lavelle ..................... G09G 5/39 345/535 |
| 6,836,272 | B2 | * | 12/2004 | Leung ...................... G09G 5/39 345/531 |

(Continued)

FOREIGN PATENT DOCUMENTS

| | | |
|---|---|---|
| JP | 2000-003308 A | 1/2000 |
| JP | 2002-007373 A | 1/2002 |
| JP | 2002-073415 A | 3/2002 |

OTHER PUBLICATIONS

Japanese Office Action for JP Application No. 2017-061109 dated Oct. 24, 2017 with English Translation.

*Primary Examiner* — Christopher D Birkhimer

(57) ABSTRACT

A processor includes a hierarchical cache memory having a higher-order cache memory and a lower-order cache memory. The hierarchical cache memory is in an inclusive state in which data stored in the higher-order cache memory is included in the lower-order cache memory. The processor also includes a cache hit determination unit configured to determine a cache hit/miss with respect to the higher-order cache memory and the lower-order cache memory at the time of accessing predetermined data, and a control unit configured to perform control to realize the inclusive state, based on the determination results of the cache hit/miss with respect to the higher-order cache memory and the lower-order cache memory.

7 Claims, 11 Drawing Sheets

(56) References Cited

U.S. PATENT DOCUMENTS

| | | | | |
|---|---|---|---|---|
| 7,552,288 B2* | 6/2009 | Iyer | G06F 12/0811 | 711/122 |
| 7,669,009 B2* | 2/2010 | Kottapalli | G06F 12/123 | 711/122 |
| 7,921,331 B2* | 4/2011 | Bose | G06F 11/1497 | 714/15 |
| 7,949,832 B2* | 5/2011 | Lilly | G06F 12/084 | 711/141 |
| 8,041,894 B2* | 10/2011 | Krumm | G06F 12/0817 | 711/122 |
| 8,347,040 B2* | 1/2013 | Lilly | G06F 12/084 | 711/141 |
| 8,364,898 B2* | 1/2013 | Balakrishnan | G06F 12/0808 | 711/122 |
| 9,043,556 B2* | 5/2015 | Balakrishnan | G06F 12/0808 | 711/118 |
| 9,304,919 B2* | 4/2016 | Kalamatianos | G06F 12/0811 | |
| 2003/0169263 A1* | 9/2003 | Lavelle | G09G 5/39 | 345/531 |
| 2003/0174137 A1* | 9/2003 | Leung | G09G 5/39 | 345/531 |
| 2004/0039880 A1* | 2/2004 | Pentkovski | G06F 12/0811 | 711/146 |
| 2004/0103251 A1* | 5/2004 | Alsup | G06F 12/0897 | 711/122 |
| 2006/0064547 A1* | 3/2006 | Kottapalli | G06F 12/123 | 711/133 |
| 2012/0096241 A1* | 4/2012 | Bell, Jr. | G06F 9/30054 | 712/207 |
| 2014/0136784 A1* | 5/2014 | Colglazier | G06F 12/0811 | 711/122 |
| 2014/0136785 A1* | 5/2014 | Colglazier | G06F 12/0811 | 711/122 |
| 2014/0359221 A1* | 12/2014 | Kalamatianos | G06F 12/0811 | 711/122 |
| 2015/0032964 A1* | 1/2015 | Habermann | G06F 12/0811 | 711/122 |

* cited by examiner

Fig.4

WHEN ADDRESS = 48 BITS

L1 CACHE | TAG ADDRESS 34 BITS | INDEX ADDRESS 8 BITS | LINE ADDRESS 6 BITS

WHEN ADDRESS = 48 BITS

L2 CACHE | TAG ADDRESS 34 BITS | INDEX ADDRESS 9 BITS | LINE ADDRESS 6 BITS

WHEN ADDRESS = 48 BITS

L3 CACHE | TAG ADDRESS 28 BITS | INDEX ADDRESS 14 BITS | LINE ADDRESS 6 BITS

Fig.6

| CASE | Vbit | COMPARISON BETWEEN COMMAND ADDRESS AND TAG ADDRESS | | HIT/MISS DETERMINATION |
|---|---|---|---|---|
| 1 | INVALID | UNMATCH | | MISS |
| 2 | INVALID | MATCH | → | MISS |
| 3 | VALID | UNMATCH | | MISS |
| 4 | VALID | MATCH | | HIT |

Fig.7

| CASE | L1 CACHE HIT/MISS DETERMINATION | L2 CACHE HIT/MISS DETERMINATION | L3 CACHE HIT/MISS DETERMINATION | OPERATION OF L1 CACHE | OPERATION OF L2 CACHE | OPERATION OF L3 CACHE |
|---|---|---|---|---|---|---|
| 1 | HIT | HIT | UNUSED | OPERATE AS L1 CACHE = HIT READ DATA OF L1 CACHE DA | NO REQUEST TO L2 CACHE READ OF L1 CACHE DA NOT REQUIRED | NO REQUEST TO L3 CACHE |
| 2 | HIT | MISS | HIT | OPERATE AS L1 CACHE = MISS OUTPUT REQUEST TO L2 CACHE REGISTER REPLY IN L1 CACHE | OPERATE AS L2 CACHE = MISS OUTPUT REQUEST TO L3 CACHE REGISTER REPLY IN L2 CACHE | OPERATE AS L3 CACHE = HIT OUTPUT READ DATA OF L3 CACHE DA TO CORE OF REQUEST SOURCE |
| 3 | HIT | MISS | MISS | OPERATE AS L1 CACHE = MISS OUTPUT REQUEST TO L2 CACHE REGISTER REPLY IN L1 CACHE | OPERATE AS L2 CACHE = MISS OUTPUT REQUEST TO L3 CACHE REGISTER REPLY IN L2 CACHE | OPERATE AS L3 CACHE = MISS OUTPUT REQUEST TO MEMORY REGISTER REPLY IN L3 CACHE, AND OUTPUT TO CORE OF REQUEST SOURCE |
| 4 | MISS | HIT | UNUSED | OPERATE AS L1 CACHE = MISS OUTPUT REQUEST TO L2 CACHE REGISTER REPLY IN L1 CACHE | OPERATE AS L2 CACHE = HIT READ DATA OF L2 CACHE DA OUTPUT TO L1 CACHE | NO REQUEST TO L3 CACHE |
| 5 | MISS | MISS | HIT | OPERATE AS L1 CACHE = MISS OUTPUT REQUEST TO L2 CACHE REGISTER REPLY IN L1 CACHE | OPERATE AS L2 CACHE = MISS OUTPUT REQUEST TO L3 CACHE REGISTER REPLY IN L2 CACHE | OPERATE AS L3 CACHE = HIT OUTPUT READ DATA OF L3 CACHE DA TO CORE OF REQUEST SOURCE |
| 6 | MISS | MISS | MISS | OPERATE AS L1 CACHE = MISS OUTPUT REQUEST TO L2 CACHE REGISTER REPLY IN L1 CACHE | OPERATE AS L2 CACHE = MISS OUTPUT REQUEST TO L3 CACHE REGISTER REPLY IN L2 CACHE | OPERATE AS L3 CACHE = MISS OUTPUT REQUEST TO MEMORY REGISTER REPLY IN L3 CACHE, AND OUTPUT TO CORE OF REQUEST SOURCE |

Fig.8

| CASE | L1 CACHE HIT/MISS DETERMINATION | L2 CACHE HIT/MISS DETERMINATION | L3 CACHE HIT/MISS DETERMINATION | OPERATION OF L1 CACHE | OPERATION OF L2 CACHE | OPERATION OF L2 CACHE |
|---|---|---|---|---|---|---|
| 1 | HIT | UNUSED | UNUSED | OPERATE AS L1 CACHE = HIT READ DATA OF L1 CACHE DA | NO REQUEST TO L2 CACHE | NO REQUEST TO L3 CACHE |
| 2 | MISS | HIT | UNUSED | OPERATE AS L1 CACHE = MISS OUTPUT REQUEST TO L2 CACHE REGISTER REPLY IN L1 CACHE | OPERATE AS L2 CACHE = HIT READ DATA OF L2 CACHE DA OUTPUT TO L1 CACHE | NO REQUEST TO L3 CACHE |
| 3 | MISS | MISS | HIT | OPERATE AS L1 CACHE = MISS OUTPUT REQUEST TO L2 CACHE REGISTER REPLY IN L1 CACHE | OPERATE AS L2 CACHE = MISS OUTPUT REQUEST TO L3 CACHE REGISTER REPLY IN L2 CACHE | OPERATE AS L3 CACHE = HIT OUTPUT READ DATA OF L3 CACHE DA TO CORE OF REQUEST SOURCE |
| 4 | MISS | MISS | MISS | OPERATE AS L1 CACHE = MISS OUTPUT REQUEST TO L2 CACHE REGISTER REPLY IN L1 CACHE | OPERATE AS L2 CACHE = MISS OUTPUT REQUEST TO L3 CACHE REGISTER REPLY IN L2 CACHE | OPERATE AS L3 CACHE = MISS OUTPUT REQUEST TO MEMORY REGISTER REPLY IN L3 CACHE, AND OUTPUT TO CORE OF REQUEST SOURCE |

Fig.9

| CASE | L1 CACHE HIT/MISS DETERMINATION | L2 CACHE HIT/MISS DETERMINATION | L3 CACHE HIT/MISS DETERMINATION | OPERATION OF L1 CACHE | OPERATION OF L2 CACHE | OPERATION OF L3 CACHE |
|---|---|---|---|---|---|---|
| 1 | HIT | HIT | HIT | OPERATE AS L1 CACHE = HIT<br>UPDATE WITH DATA OF STORE COMMAND OF L1 CACHE DA<br>OUTPUT REQUEST TO L2 CACHE | OPERATE AS L2 CACHE = HIT<br>UPDATE WITH DATA OF STORE COMMAND OF L2 CACHE DA<br>OUTPUT REQUEST TO L3 CACHE | OPERATE AS L3 CACHE = HIT<br>UPDATE WITH DATA OF STORE COMMAND OF L3 CACHE DA<br>NOT OUTPUT REQUEST TO MEMORY |
| - | HIT | HIT | MISS | INCLUSION RELATIONSHIP BETWEEN L2 CACHE AND L3 CACHE IS ALWAYS MAINTAINED, SO THIS STATE DOES NOT EXIST | | |
| 2 | HIT | MISS | HIT | OPERATE AS L1 CACHE = MISS<br>NOT UPDATE L1 CACHE DA<br>OUTPUT REQUEST TO L2 CACHE | OPERATE AS L2 CACHE = MISS<br>NOT UPDATE L2 CACHE DA<br>OUTPUT REQUEST TO L3 CACHE | OPERATE AS L3 CACHE = HIT<br>UPDATE WITH DATA OF STORE COMMAND OF L3 CACHE DA<br>NOT OUTPUT REQUEST TO MEMORY |
| 3 | HIT | MISS | MISS | OPERATE AS L1 CACHE = MISS<br>NOT UPDATE L1 CACHE DA<br>OUTPUT REQUEST TO L2 CACHE | OPERATE AS L2 CACHE = MISS<br>NOT UPDATE L2 CACHE DA<br>OUTPUT REQUEST TO L3 CACHE | OPERATE AS L3 CACHE = MISS<br>OUTPUT REQUEST TO MEMORY<br>REGISTER REPLY IN L3 CACHE, AND UPDATE L3 CACHE DA WITH DATA OF STORE COMMAND |
| 4 | MISS | HIT | HIT | OPERATE AS L1 CACHE = MISS<br>NOT UPDATE L1 CACHE DA<br>OUTPUT REQUEST TO L2 CACHE | OPERATE AS L2 CACHE = HIT<br>UPDATE WITH DATA OF STORE COMMAND OF L2 CACHE DA<br>OUTPUT REQUEST TO L3 CACHE | OPERATE AS L3 CACHE = HIT<br>UPDATE WITH DATA OF STORE COMMAND OF L3 CACHE DA<br>NOT OUTPUT REQUEST TO MEMORY |
| - | MISS | HIT | MISS | INCLUSION RELATIONSHIP BETWEEN L2 CACHE AND L3 CACHE IS ALWAYS MAINTAINED, SO THIS STATE DOES NOT EXIST | | |
| 5 | MISS | MISS | HIT | OPERATE AS L1 CACHE = MISS<br>NOT UPDATE L1 CACHE DA<br>OUTPUT REQUEST TO L2 CACHE | OPERATE AS L2 CACHE = MISS<br>NOT UPDATE L2 CACHE DA<br>OUTPUT REQUEST TO L3 CACHE | OPERATE AS L3 CACHE = HIT<br>UPDATE WITH DATA OF STORE COMMAND OF L3 CACHE DA<br>NOT OUTPUT REQUEST TO MEMORY |
| 6 | MISS | MISS | MISS | OPERATE AS L1 CACHE = MISS<br>NOT UPDATE L1 CACHE DA<br>OUTPUT REQUEST TO L2 CACHE | OPERATE AS L2 CACHE = MISS<br>NOT UPDATE L2 CACHE DA<br>OUTPUT REQUEST TO L3 CACHE | OPERATE AS L3 CACHE = MISS<br>OUTPUT REQUEST TO MEMORY<br>REGISTER REPLY IN L3 CACHE, AND UPDATE L3 CACHE DA WITH DATA OF STORE COMMAND |
| | WRITE-THROUGH SYSTEM, NO WRITE ALLOCATION | | | WRITE-THROUGH SYSTEM, NO WRITE ALLOCATION | WRITE-THROUGH SYSTEM, NO WRITE ALLOCATION | WRITE-THROUGH SYSTEM, WITH WRITE ALLOCATION |

Fig.10

| CASE | L1 CACHE HIT/MISS DETERMINATION | L2 CACHE HIT/MISS DETERMINATION | L3 CACHE HIT/MISS DETERMINATION | OPERATION OF L1 CACHE | OPERATION OF L2 CACHE | OPERATION OF L3 CACHE |
|---|---|---|---|---|---|---|
| 1 | HIT | HIT | HIT | OPERATE AS L1 CACHE = HIT UPDATE WITH DATA OF STORE COMMAND OF L1 CACHE DA OUTPUT REQUEST TO L2 CACHE | OPERATE AS L2 CACHE = HIT UPDATE WITH DATA OF STORE COMMAND OF L2 CACHE DA OUTPUT REQUEST TO L3 CACHE | OPERATE AS L3 CACHE = HIT UPDATE WITH DATA OF STORE COMMAND OF L3 CACHE DA NOT OUTPUT REQUEST TO MEMORY |
| – | HIT | HIT | MISS | INCLUSION RELATIONSHIPS BETWEEN L1 CACHE AND L2 CACHE AND BETWEEN L2 CACHE AND L3 CACHE ARE ALWAYS MAINTAINED, SO THIS STATE DOES NOT EXIST | | |
| – | HIT | MISS | HIT | INCLUSION RELATIONSHIPS BETWEEN L1 CACHE AND L2 CACHE AND BETWEEN L2 CACHE AND L3 CACHE ARE ALWAYS MAINTAINED, SO THIS STATE DOES NOT EXIST | | |
| – | HIT | MISS | MISS | INCLUSION RELATIONSHIPS BETWEEN L1 CACHE AND L2 CACHE AND BETWEEN L2 CACHE AND L3 CACHE ARE ALWAYS MAINTAINED, SO THIS STATE DOES NOT EXIST | | |
| 2 | MISS | HIT | HIT | OPERATE AS L1 CACHE = MISS NOT UPDATE L1 CACHE DA OUTPUT REQUEST TO L2 CACHE | OPERATE AS L2 CACHE = HIT UPDATE WITH DATA OF STORE COMMAND OF L2 CACHE DA OUTPUT REQUEST TO L3 CACHE | OPERATE AS L3 CACHE = HIT UPDATE WITH DATA OF STORE COMMAND OF L3 CACHE DA NOT OUTPUT REQUEST TO MEMORY |
| – | MISS | HIT | MISS | INCLUSION RELATIONSHIPS BETWEEN L1 CACHE AND L2 CACHE AND BETWEEN L2 CACHE AND L3 CACHE ARE ALWAYS MAINTAINED, SO THIS STATE DOES NOT EXIST | | |
| 3 | MISS | MISS | HIT | OPERATE AS L1 CACHE = MISS NOT UPDATE L1 CACHE DA OUTPUT REQUEST TO L2 CACHE | OPERATE AS L2 CACHE = MISS NOT UPDATE L2 CACHE DA OUTPUT REQUEST TO L3 CACHE | OPERATE AS L3 CACHE = HIT UPDATE WITH DATA OF STORE COMMAND OF L3 CACHE DA NOT OUTPUT REQUEST TO MEMORY |
| 4 | MISS | MISS | MISS | OPERATE AS L1 CACHE = MISS NOT UPDATE L1 CACHE DA OUTPUT REQUEST TO L2 CACHE | OPERATE AS L2 CACHE = MISS NOT UPDATE L2 CACHE DA OUTPUT REQUEST TO L3 CACHE | OPERATE AS L3 CACHE = MISS OUTPUT REQUEST TO MEMORY REGISTER REPLY IN L3 CACHE, AND UPDATE L3 CACHE DA WITH DATA OF STORE COMMAND |
| | | | | WRITE-THROUGH SYSTEM, NO WRITE ALLOCATION | WRITE-THROUGH SYSTEM, NO WRITE ALLOCATION | WRITE-THROUGH SYSTEM, WITH WRITE ALLOCATION |

PROCESSOR

INCORPORATION BY REFERENCE

The present invention is based upon and claims the benefit of priority from Japanese patent application No. 2017-061109, filed on Mar. 27, 2017, the disclosure of which is incorporated herein in its entirety by reference.

Technical Field

The present invention relates to a processor, and in particular, to a processor having a hierarchical cache memory.

Background Art

In recent years, the number of logical circuits mountable on an LSI is increased significantly due to microfabrication of a semiconductor process. Accordingly, a multi core processor on which a plurality of cores are mounted is generally used. In a multi core processor, a plurality of cores share a memory. In the case of a processor having a cache memory, it is necessary to consider data consistency between the cache and the memory.

In order to keep data consistency, there are a processor that maintains data consistency by hardware, a processor that maintains data consistency by software, and a processor that maintains data consistency in combination of hardware and software. A processor that maintains data consistency by hardware is widely used, because it has advantages that software development is easy and that high performance is achievable because cache flash control by software is not required.

However, under a circumstance that the cache hierarchy is getting deeper due to an increase in the number of cores and to conceal memory latency, there is a problem that the number of control circuits for maintaining data consistency by the hardware is increased and they are complicated. In particular, in a vector processor, it is necessary to invalidate caches with respect to a plurality of addresses in the case of a vector store command. Accordingly, the problem of control circuits for maintaining data consistency by the hardware is serious.

Description will be given specifically on a processor including a hierarchical cache memory as illustrated in FIG. 1. The processor has a configuration in which a core 0 (100) and a core 1 (110) have L1 caches 101 and 111 and L2 caches 102 and 112 therein, and the cores share an L3 cache 120. Here, the configuration realizes an inclusive cache in which data of the L1 cache is included in the L2 cache, and data of the L2 cache is included in the L3 cache. In order to maintain the inclusive relationship between the caches, cache invalidation control is required.

As technologies related to a hierarchical cache memory including the L1 cache and the L2 cache as described above, those disclosed in JP 2002-007373 A (Patent Literature 1) and JP 2000-003308 A (Patent Literature 2) have been known. In Patent Literatures 1 and 2, determination of a cache hit/miss is performed simultaneously on two hierarchical cache memories.

FIG. 2 illustrates a detailed configuration, including cache control, of the processor illustrated in FIG. 1. In this configuration, in order to maintain the inclusive relationship between the L2 cache and the L3 cache, it is necessary to perform control as described below.

First, an L3 cache 300 has L2 cache holding information 305 that is information of data held by an L2 cache 240 of each core (core 0 (200), core n (n200)). Then, at the time of updating the L3 cache 300, it is checked whether or not the L2 cache 240 of each of the cores 200 and n200 holds the corresponding data. When it holds the data, an invalidation control unit 308 outputs an invalidation request to each of the cores 200 and n200. Then, in each of the cores 200 and n200, an L2 cache invalidation control unit 247 invalidates an L2 cache address array 242. It should be noted that the time of updating the L3 cache means the time of updating the data of an L3 cache data array 303 by a store command, or the time when the entire ways of an L3 cache address array 302 are in use and eviction for 1 way is required.

Further, in the configuration described above, in order to maintain the inclusive relationship between an L1 cache 220 and the L2 cache 240, it is necessary to perform control as described below. First, the L2 cache invalidation control unit 247 outputs invalidation information of the L2 cache 240. Then, a hit/miss determination unit 226 performs hit/miss determination by using an L1 cache address array copy 223. When it is hit, an L1 cache invalidation control unit 228 invalidates an L1 cache address array 222. The reason of using the L1 cache address array copy 223 is to invalidate the L1 cache address array 222 by performing hit/miss determination of the L1 cache 220 without lowering the capacity of the L1 cache address array 222 that is frequently used.

Besides, there is also a mounting method such as allowing the L1 cache address array 222 to have a multi-port. Moreover, there is also a mounting method of performing mediation of read requests (two read requests including a request control unit and invalidation exist) of the L1 cache address array 222 (performance is lowered because one L1 cache address array is used through mediation).

[Patent Literature 1] JP 2002-007373 A
[Patent Literature 2] JP 2000-003308 A

However, in the case of maintaining the inclusive relationship in a hierarchical cache memory between the L1 cache and the L2 cache as described above, invalidation control circuits are mounted on both the L1 cache and the L2 cache. Accordingly, there is a problem of an increase in the number of circuits and complication of cache control.

Besides cache invalidation control used for a general processor as described above, in a vector processor, store is performed simultaneously on a plurality of addresses by using a vector store command. At that time, in the case of having caches not accessed by a vector command (L1 cache and the L2 cache in FIG. 1, the L3 cache is accessible by a vector command), in order to maintain cache coherency, it is necessary to perform cache invalidation (on the L1 cache and the L2 cache) at the same time as processing of the vector store command. In particular, cache invalidation control in the vector processor must be performed on a plurality of addresses in parallel. As such, even in the vector processor, invalidation control circuits should be mounted on both the L1 cache and the L2 cache. This causes a problem of a significant increase in the number of circuits and complication of cache control, which is more serious than in the case of a general processor.

SUMMARY

In view of the above, an exemplary object of the present invention is to solve the aforementioned problem, that is, an increase in the number of circuits and complication of control in the case of maintaining an inclusive relationship in a hierarchical cache memory.

A processor, according to an exemplary aspect of the present invention, includes a hierarchical cache memory having a higher-order cache memory and a lower-order cache memory, the hierarchical cache memory being in an inclusive state in which data stored in the higher-order cache memory is included in the lower-order cache memory;

a cache hit determination unit configured to determine a cache hit/miss with respect to the higher-order cache memory and the lower-order cache memory at the time of accessing predetermined data; and a control unit configured to perform control to realize the inclusive state, based on determination results of the cache hit/miss with respect to the higher-order cache memory and the lower-order cache memory.

A cache memory control device, according to an exemplary aspect of the present invention, is configured to control a hierarchical cache memory having a higher-order cache memory and a lower-order cache memory to realize an inclusive state in which data stored in the higher-order cache memory is included in the lower-order cache memory. The cache memory control device includes a cache hit determination unit configured to determine a cache hit/miss with respect to the higher-order cache memory and the lower-order cache memory at the time of accessing predetermined data, and a control unit configured to perform control to realize the inclusive state in the higher-order cache memory and the lower-order cache memory, based on determination results of the cache hit/miss with respect to the higher-order cache memory and the lower-order cache memory.

A program, according to an exemplary aspect of the present invention, is configured to cause a cache memory control device to realize, the cache memory control device being configured to control a hierarchical cache memory having a higher-order cache memory and a lower-order cache memory to realize an inclusive state in which data stored in the higher-order cache memory is included in the lower-order cache memory, a cache hit determination unit configured to determine a cache hit/miss with respect to the higher-order cache memory and the lower-order cache memory at the time of accessing predetermined data, and a control unit configured to perform control to realize the inclusive state in the higher-order cache memory and the lower-order cache memory, based on determination results of the cache hit/miss with respect to the higher-order cache memory and the lower-order cache memory.

A cache memory control method, according to an exemplary aspect of the present invention, is a method performed by a processor including a hierarchical cache memory having a higher-order cache memory and a lower-order cache memory. The hierarchical cache memory is in an inclusive state in which data stored in the higher-order cache memory is included in the lower-order cache memory. The method includes determining a cache hit/miss with respect to the higher-order cache memory and the lower-order cache memory at the time of accessing predetermined data, and performing control to realize the inclusive state, based on determination results of the cache hit/miss with respect to the higher-order cache memory and the lower-order cache memory.

As the present invention is configured as described above, it is possible to suppress an increase in the number of circuits and complication of control in the case of maintaining an inclusive relationship in a hierarchical cache memory.

BRIEF DESCRIPTION OF THE DRAWINGS

FIG. 4 illustrates examples of addresses of respective caches of the present invention;

FIG. 6 illustrates examples of hit/miss determination on respective caches of the present invention;

FIG. 7 is a table illustrating hit/miss determination on respective caches and operation of respective caches when a load command is issued in the present invention;

FIG. 8 is a table illustrating hit/miss determination on respective caches and operation of respective caches when a load command is issued in the background art;

FIG. 9 is a table illustrating hit/miss determination on respective caches and operation of respective caches when a store command is issued in the present invention;

FIG. 10 is a table illustrating hit/miss determination on respective caches and operation of respective caches when a store command is issued in the background art;

EXEMPLARY EMBODIMENTS

First Exemplary Embodiment

Figure 11:
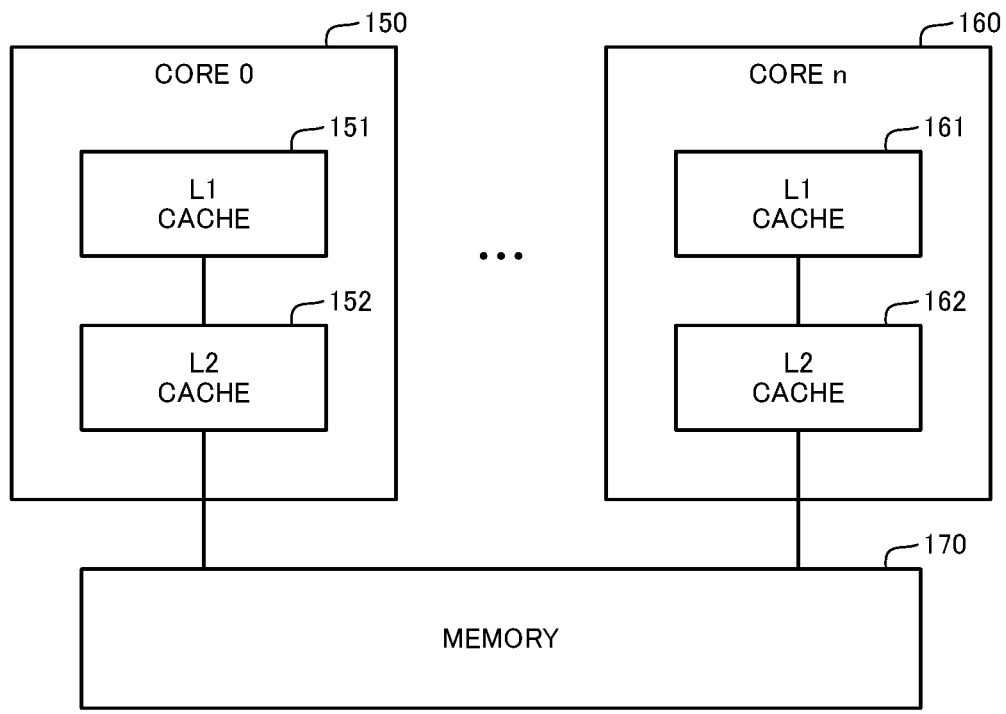
FIG. 11 is a block diagram illustrating another configuration of an information processing apparatus including a processor according to the first exemplary embodiment of the present invention.

A first exemplary embodiment of the present invention will be described with reference to FIG. 1 and FIGS. 3 to 11. FIG. 1 and FIGS. 3 to 6 are diagrams for explaining a configuration of an information processing apparatus including a processor. FIGS. 7 to 10 are tables for explaining operation of a processor. FIG. 11 is a diagram illustrating another exemplary configuration of an information processing apparatus.

[Configuration]

Figure 1:
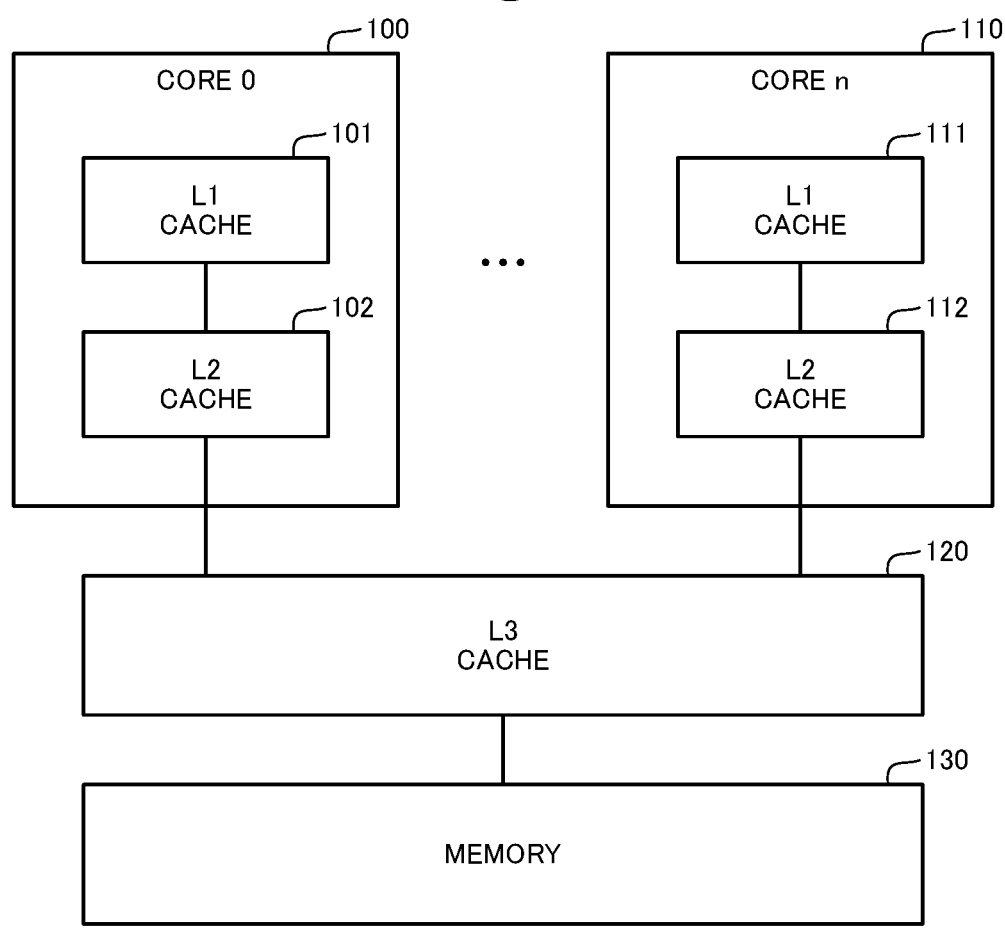
FIG. 1 is a block diagram illustrating a configuration of a processor including a hierarchical cache memory, a shared cache, and a memory.

As illustrated in FIG. 1, the present invention is realized by an information processing apparatus including a processor having a plurality of cores, that is, from a core 0 (100) to a core n (110), an L3 cache 120, and a memory 130. The cores 100 and 110 each have a hierarchical cache memory including an L1 cache 101 or 111 that is a higher-order cache memory, and an L2 cache memory 102 or 112 that is a lower-order cache memory.

The L3 cache 120 is a cache memory located lower than the L1 cache and the L2 cache, and is shared by the cores 100 and 110. The memory 130 is a main storage device of the information processing apparatus, and is located lower than the L3 cache 120.

The present invention is particularly configured to realize an inclusive cache (inclusive state) (also referred to as an inclusion cache) in which the data of the L1 caches 101 and 111 is included in the L2 caches 102 and 112, and the data of the L2 caches 102 and 112 is included in the L3 cache 120.

A more detailed configuration of the aforementioned information processing apparatus will be described with reference to FIG. 3. It should be noted that in FIG. 3, the cores 100 and 110 in FIG. 1 are denoted by reference numerals 500 and n500, the L1 caches 101 and 111 in FIG. 1 are denoted by a reference numeral 520, and the L2 caches 102 and 112 in FIG. 1 are denoted by a reference numeral 540. Further, in FIG. 3, the L3 cache 120 in FIG. 1 is denoted by a reference numeral 600, and the memory 130 in FIG. 1 is denoted by a reference numeral 620.

The core 0 (500) includes a command control unit 501, an arithmetic control unit 502, the L1 cache 520, and the L2 cache 540. The L1 cache 520 includes a request control unit 521, an L1 cache address array (hereinafter address array is referred to as AA) 522, an L1 cache data array (hereinafter data array is referred to as DA) 523, a reply control unit 524, a hit/miss determination unit 525, and a request generation control unit 526. The L2 cache 540 includes a request control unit 541, an L2 cache AA 542, an L2 cache DA 543, a reply control unit 544, a request generation control unit 545, and an L2 cache invalidation control unit 546.

It should be noted that the core n (n500) has the same configuration as the aforementioned core. This means that the core n includes a command control unit, an arithmetic control unit, an L1 cache, and an L2 cache, although not illustrated in FIG. 3. The L1 cache in the core n includes a request control unit, an L1 cache AA, an L1 cache DA, a reply control unit, a hit/miss determination unit, and a request generation control unit. The L2 cache in the core n includes a request control unit, an L2 cache AA, an L2 cache DA, a reply control unit, a request generation control unit, and an L2 cache invalidation control unit.

The L3 cache 600 includes a request control unit 601, an L3 cache AA 602, an L3 cache DA 603, a reply control unit 604, an L2 cache holding information 605, a hit/miss determination unit 606, a request generation control unit 607, and an invalidation control unit 608.

Figure 3:
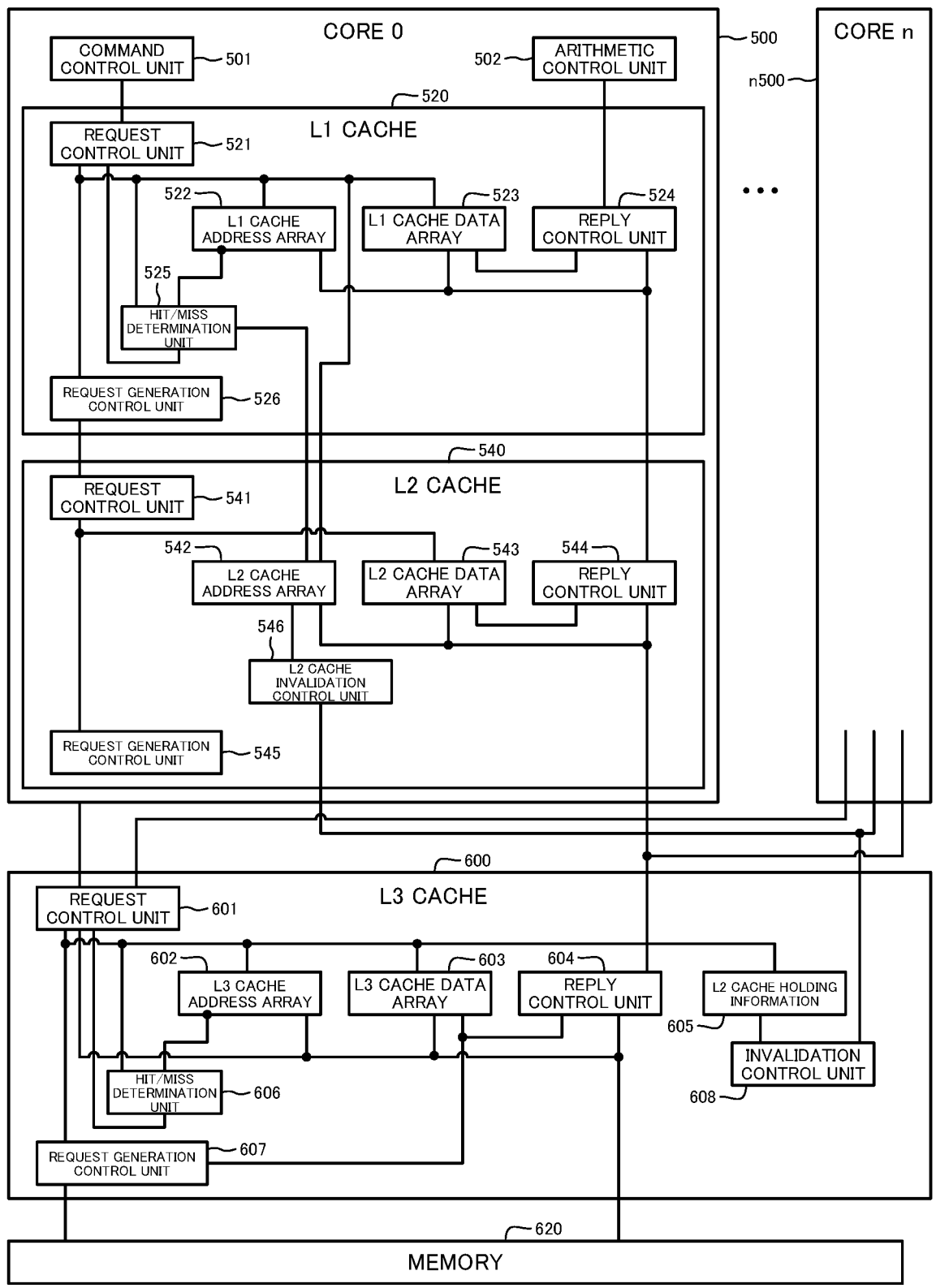
FIG. 3 is a block diagram illustrating a configuration of an information processing apparatus including a processor according to a first exemplary embodiment of the present invention.

The respective constituent elements are connected with each other by respective signal lines illustrated in FIG. 3. However, configurations of the core, the L1 cache, the L2 cache, and the L3 cache are not limited to those illustrated in FIG. 3. They may have other constituent elements. Further, the connection relationships between the respective constituent elements are not limited to those illustrated in FIG. 3.

The respective constituent elements illustrated in FIG. 3 are realized by incorporating a program in the arithmetic unit. It should be noted that a program is stored on a computer-readable storage medium, and is read from such a storage medium into the arithmetic unit and executed.

The outlines of the functions of the aforementioned configurations will be described. As described above, the respective control units in the core 500 perform control to realize an inclusive cache (inclusive state) in which the data of the L1 cache 520 is included in the L2 cache 540. In addition, the data of the L2 cache 540 is included in the L3 cache 600.

Then, at the time of accessing predetermined data, that is, at the time of accessing the L1 cache, the hit/miss determination unit 525 (cache hit determination unit) searches both the L1 cache address array 522 and the L2 cache address array 542 to determine whether a cache hit or a cache miss occurs. Then, based on the respective determination results of the cache hit/miss with respect to the L1 cache address array 522 and the L2 cache address array 542, the respective control units operate as described below.

First, when the L1 cache=hit and the L2 cache=hit, they operate as L1 cache=hit. At this time, data is read from the L1 cache data array and used. The L2 cache data array is not used.

Meanwhile, when the L1 cache=hit and the L2 cache=miss, it is the case where the L1 cache is accessed after only the L2 cache was invalidated. At this time, the inclusion relationship between the L1 cache and the L2 cache is temporarily in a non-inclusive state because the data of the L1 cache is not included in the L2 cache. In this state, as there is no valid data in the L2 cache, the data existing in the L1 cache is handled as invalid data. Accordingly, operation is made under a condition that the L1 cache=miss and the L2 cache=miss. Then, reply data from the L3 cache is registered in the L1 cache data array and the L2 cache data array. With this operation, the inclusion relationship between the L1 cache and the L2 cache is returned to an inclusive state.

When the L1 cache=miss and the L2 cache=hit, operation is made under a condition that the L1 cache=miss and the L2 cache=hit. At this time, data is read from the L2 cache data array and registered in the L1 cache data array.

When the L1 cache=miss and the L2 cache=miss, operation is made under a condition that the L1 cache=miss and the L2 cache=miss. At this time, reply data from the L3 cache is registered in the L1 cache data array and the L2 cache data array.

Figure 2:
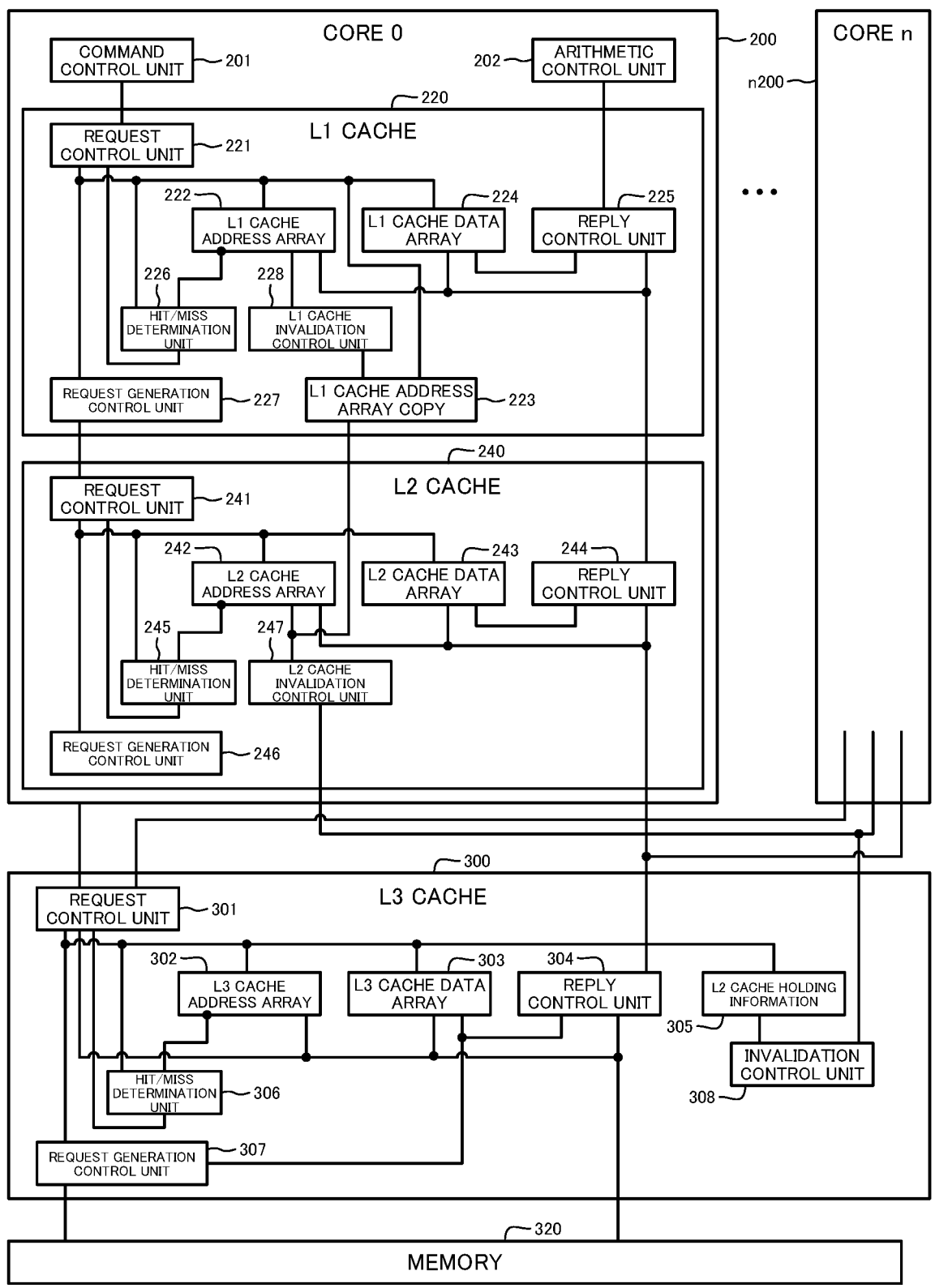
FIG. 2 is a block diagram illustrating a configuration of an information processing apparatus including a processor of background art.

With the function described above, it is not necessary to have the L1 cache invalidation control unit 218 and the configuration related thereto for maintaining the inclusion relationship between the L1 cache and the L2 cache, which exist in the background art described with reference to FIG. 2. This means that in the present invention, the L1 cache 520 does not have an L1 cache invalidation control unit, and only the L2 cache 540 has the L2 cache invalidation control unit 546 (invalidation unit) as illustrated in FIG. 3, compared with the background art. In this case, there is a case where only the L2 cache is invalidated, whereby the inclusion relationship between the L1 cache and the L2 cache may be in a non-inclusive state temporarily. However, in the present invention, at the time of access for actually using the data of the L1 cache, the state is returned to the inclusive state by performing the hit/miss determination, as described above. Accordingly, the inclusion relationship between the L1 cache 520 and the L2 cache 540 can be maintained. As a result, it is possible to suppress an increase in the number of circuits and complication of control.

[Operation]

Next, operation of the aforementioned configuration will be described. In the operation described below, description will be given on the case where a "load command" and a "store command", that are commands to use a memory and caches, are issued. Further, as an example, it is assumed that the caches 520, 540, and 600 each have a configuration described below.

L1 cache: capacity=64 KB, 4-way set associative, line size=64 B

L2 cache: capacity=256 KB, 8-way set associative, line size=64 B

L3 cache: capacity=16 MB, 16-way set associative, line size=64 B

In the aforementioned configuration, when an address has 48 bits, each of the tag address and the index address of each cache has the number of bits shown in FIG. 4. Further, each of the L1 cache 520 and the L2 cache 540 in the core is a write-through cache with no write allocation operation at the time of store command cache miss. The L3 cache 600 shared by the respective cores is a write-back cache, with write allocation operation at the time of store command cache miss.

<Operation for Load Command>

The command control unit 501 issues a load command to the request control unit 521 via a signal line. The request control unit 521 outputs the address of the load command to the L1 cache AA 522, the L2 cache AA 542, the L1 cache DA 523, and the hit/miss determination unit 525, via a signal line.

Figure 5:
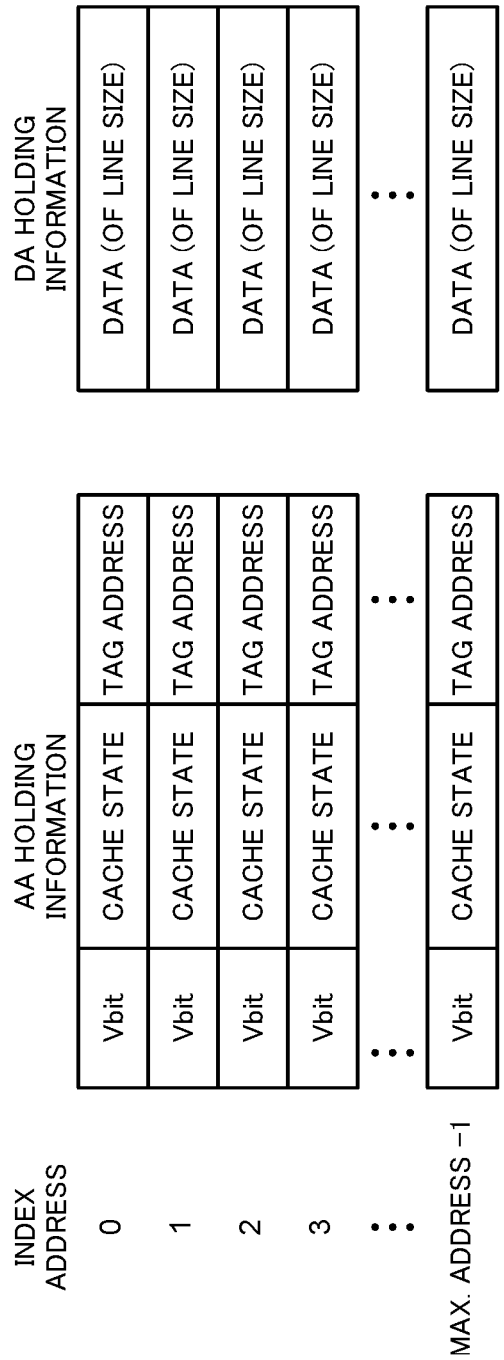
FIG. 5 illustrates exemplary configurations of address arrays and data arrays of the present invention.

Here, configurations of the address arrays (AA) 522 and 542 and the data arrays (DA) 523 and 543 of the caches 520 and 540 of the present invention will be described with use of FIG. 5. In each AA, a tag address, cache status information (V bit), and a cache state are stored. Further, in each DA, data is stored. The status information is a bit=V bit representing whether or not it is valid for each cache line. The cache state is a bit (=called modifier) representing whether or not the content of the memory and the content of the cache match. The cache state is necessary in the write-back system but is not necessary in the write-through system. As such, it is omitted in the description of the L1 cache and the L2 cache.

The L1 cache AA 522 and the L2 cache AA 542 output the tag address and the V bit, registered with use of an index address, to the hit/miss determination unit 525 via a signal line. The hit/miss determination unit 525 performs hit/miss determination using information of both the L1 cache 520 and the L2 cache 540 and the address of the load command.

First, hit/miss determination for each cache includes four types of cases illustrated in FIG. 6. Only when the V bit=valid and a comparison result between the address (bit corresponding to tag address) of the load command and the tag address match, a hit occurs. In the present invention, hit/miss determination is performed not only for each cache. Final hit/miss determination is performed by combining hit/miss determination of the L1 cache 520 and the L2 cache 540. FIG. 7 is a table illustrating hit/miss determination of respective caches and operation of respective caches in the present invention. In this example, six types of cases exist, each of which will be described.

Case 1 (L1 cache=hit, L2 cache=hit, L3 cache=unused)

The hit/miss determination unit 525 of the L1 cache 520 determines that the L1 cache=hit. Address data of the load command is read from the L1 cache DA 523, and is output to the reply control unit 524 via a signal line. The reply control unit 524 performs mediation with reply data from the L2 cache 540 output via a signal line, and outputs data to the arithmetic control unit 502 via a signal line. When processing (for example, sign extension or the like) required as a load command is designated to the received data, the arithmetic control unit 502 performs arithmetic operation on the data.

Case 2 (L1 cache=hit, L2 cache=miss, L3 cache=hit)

The hit/miss determination unit 525 of the L1 cache 520 determines that the L1 cache=miss. Then, the hit/miss determination unit 525 requests, via a signal line, the request control unit 521 to output a request. The request control unit 521 outputs a request to the request generation control unit 526 via a signal line. The request generation control unit 526 generates a request by adding information such as a command operation code, the address, and the L2 cache=miss, and outputs it to the request control unit 541 of the L2 cache 540 via a signal line.

The request control unit 541 of the L2 cache 540 interprets the information added to the request. As it is a load command of the L2 cache=miss, the request control unit 541 outputs a request to the request generation control unit 545 via a signal line. The request generation control unit 545 generates a request and outputs it to the request control unit 601 of the L3 cache 600 via a signal line.

The request control unit 601 of the L3 cache 600 interprets the information added to the request, and outputs information such as the command operation code and the address to the L3 cache AA 602 and the hit/miss determination unit 606 via a signal line 610. The L3 cache AA 602 outputs the tag address, the V bit, and the cache state, registered with use of the index address, to the hit/miss determination unit 606 via a signal line.

The hit/miss determination unit 606 of the L3 cache 600 determines that the L3 cache=hit. Then, the hit/miss determination unit 606 requests the request control unit 601 for a read request of the L3 cache DA 603 and registration in the L2 cache holding information 605, via a signal line. The request control unit 601 outputs a read request of the L3 cache DA 603 and registration in the L2 cache holding information 605. The L3 cache DA 603 reads data of a line size of the L2 cache including the address of the load command, and outputs it to the reply control unit 604 via a signal line. At this time, when the data width of the signal line is less than the line size of the L2 cache, the data is dividedly read and output a plurality of times. The reply control unit 604 performs mediation with a reply from the memory output via a signal line, outputs data to the L2 cache DA 543 and the reply control unit 544 via a signal line, and outputs information representing the final element of the data to the L2 cache AA 542.

In the L2 cache holding information 605, information for maintaining coherency between the L2 cache and the L3 cache of each core is stored. In general, it is called a directory. While there are various implementation methods, as an example of simple implementation, a copy of the L2 cache AA 542 of each core is held, and when a hit occurs, it can be checked that the L2 cache of each core holds the corresponding data. In such an implementation method, a very large circuit area is required. Accordingly, as another implementation method, information that which way of the L2 cache of which core holds the data is stored, for each line of the L3 cache. In the present invention, the latter implementation method is used as an example. In the L2 cache holding information 605, information of the core number that returned a reply and the way number, in which the reply is to be registered, of the L2 cache is stored.

In the L2 cache 540, the reply data from the L3 cache 600 is stored in the L2 cache DA 543, and when information representing the final element of the data of the line size is received, the V bit of the L2 cache AA 542 is validated. Further, the reply control unit 544 performs mediation with the read data from the L2 cache DA 542 output via a signal line, outputs the reply from the L3 cache 600 to the L1 cache DA 523 and the reply control unit 524 via a signal line, and outputs the information representing the final element of the data to the L1 cache AA 522.

In the L1 cache 520, the reply data from the L2 cache 540 is stored in the L1 cache DA 523, and when the information representing the final element of the data of the line size is received, the V bit of the L1 cache AA 522 is validated. Further, the reply control unit 524 performs mediation with the read data from the L1 cache DA 523 output via a signal line, and outputs data required by the load command in the data of the line size of the cache, to the arithmetic control unit 502 via a signal line. When processing (for example, sign extension or the like) required as a load command is designated to the received data, the arithmetic control unit 502 performs arithmetic operation on the data.

Case 3 (L1 cache=hit, L2 cache=miss, L3 cache=miss)

Operation of the L1 cache 520 is miss determination. Therefore, it is the same as the case 2.

Operation of the L2 cache 540 is miss determination. Therefore, it is the same as the case 2.

The request control unit 601 of the L3 cache 600 interprets the information added to the request, and outputs information such as the command operation code and the address to the L3 cache AA 602 and the hit/miss determination unit 606 via a signal line. The L3 cache AA 602 outputs the tag address, the V bit, and the cache state, registered with use of the index address, to the hit/miss determination unit 606 via a signal line. The hit/miss determination unit 606 of the L3 cache determines that the L3 cache=miss and there is a free way. The hit/miss determination unit 606 requests, via a signal line, the request control unit 601 to output a request.

The request control unit 601 outputs a request to the request generation control unit 607 via a signal line. The request generation control unit 607 generates a request (load) by adding information such as the command operation code and the address, and outputs it to the memory 620 via a signal line. In the L2 cache holding information 605, information of the core number from which a reply is to be returned, and the way number to which the reply is to be registered of the L2 cache, is stored.

The memory 620 outputs reply data of the target address via a signal line for a request (load).

In the L3 cache 600, the reply data from the memory 620 is stored in the L3 cache DA 603, and when information representing the final element of the data of the line size is received, the V bit of the L3 cache AA is validated, and the cache state is set to "modified=0" (a state where the content of the memory and the content of the cache match). Further, the reply control unit 604 performs mediation with the read data from the L3 cache DA 603 output via a signal line, outputs the reply from the memory 620 to the L2 cache DA 543 and the reply control unit 544, and outputs the information representing the final element of the data to the L2 cache AA 542.

Reply operation of the L2 cache is the same as the operation in the case 2.

Reply operation of the L1 cache is the same as the operation in the case 2.

Operation of the arithmetic control unit 502 is the same as the operation in the case 2.

Case 4 (L1 cache=miss, L2 cache=hit, L3 cache=unused)

The hit/miss determination unit 525 of the L1 cache determines that the L1 cache=miss. Then, the hit/miss determination unit 525 requests, via a signal line, the request control unit 521 to output a request. The request control unit 521 outputs a request to the request generation control unit 526 via a signal line. The request generation control unit 526 generates a request by adding information such as a command operation code, the address, and the L2 cache=hit, and outputs it to the request control unit 541 of the L2 cache 540 via a signal line.

The request control unit 541 of the L2 cache 540 interprets the information added to the request. As it is a load command of the L2 cache=hit, the request control unit 541 reads the data of the line size of the L1 cache including the address of the load command from the L2 cache DA 543, and outputs it to the reply control unit 544 via a signal line. When the data width of the signal line is less than the line size of the L1 cache, the data is dividedly read and output a plurality of times. The reply control unit 544 performs mediation with the reply from the L3 cache 600 output via a signal line, outputs the data to the L1 cache DA 523 and the reply control unit 524 via the signal line, and outputs the information representing the final element of the data to the L1 cache AA 522.

Reply operation of the L1 cache 520 is the same as the operation in the case 2.

Operation of the arithmetic control unit 502 is the same as the operation in the case 2.

Case 5 (L1 cache=miss, L2 cache=miss, L3 cache=hit)

Operation is the same as in the case 2.

Case 6 (L1 cache=miss, L2 cache=miss, L3 cache=miss)

Operation is the same as in the case 3.

FIG. 8 illustrates operation in the case of a technology compared with the present invention as a reference. In this example, there are four types of cases.

Further, other than the operation of the aforementioned cases, there is a case where when the L3 cache=miss, the entire ways are used so that replacement of valid data is required. However, it is the same as typical write-back cache operation and is not unique to the present invention. Therefore, the description is simplified.

Case 7 (no write-back operation)

Operation of the L1 cache 520 is miss determination. Therefore, it is the same as in the case 2.

Operation of the L2 cache 540 is miss determination. Therefore, it is the same as in the case 2.

The request control unit 601 of the L3 cache 600 interprets the information added to the request, and outputs information such as the command operation code and the address to the L3 cache AA 602 and the hit/miss determination unit 606 via a signal line. The L3 cache AA 602 outputs the tag address, the V bit, and the cache state, registered with use of the index address, to the hit/miss determination unit 606 via a signal line.

When the hit/miss determination unit 606 of the L3 cache detects that the L3 cache=miss and the entire ways are in use, the hit/miss determination unit 606 selects a replacement object way from the ways according to the replacement policy (for example, LRU or the like). When the cache state of the replacement object way is "modified=0" (the content of the memory and the content of the cache match), replacement with no write-back operation is requested to the request control unit 601. The request control unit 601 invalidates the V bit of the object way of the L3 cache AA 602. Further, in order to maintain coherency between the L2 cache and the L3 cache, the L2 cache holding information 605 is checked. When the V bit is used in the L2 cache of each core, the invalidation control unit 608 outputs an invalidation request to each core, and the L2 cache invalidation control unit 546 invalidates the V bit of the L2 cache AA 542.

With the operation described above, a free space for 1 way is acquired, and the replacement is completed. After this, operation is performed as general L3 cache miss (equivalent to the case 3). The request control unit 601 outputs a request to the request generation control unit 607 via a signal line. The request generation control unit 607 generates a request (load) by adding information such as the command operation code and the address, and outputs it to the memory 620 via a signal line. In the L2 cache holding information 605, information of the core number from which a reply is to be returned and the way number to which the reply is to be registered of the L2 cache is stored. Operation subsequent to the memory is the same as the operation in the case 3.

Case 8 (with write-back operation)

Operation of the L1 cache 520 is miss determination. Therefore, it is the same as in the case 2.

Operation of the L2 cache 5420 is miss determination. Therefore, it is the same as in the case 2.

The request control unit 601 of the L3 cache 600 interprets the information added to the request, and outputs information such as the command operation code and the address to the L3 cache AA 602 and the hit/miss determination unit 606 via a signal line. The L3 cache AA 602 outputs the tag address, the V bit, and the cache state, registered with use of the index address, to the hit/miss determination unit 606 via a signal line.

When the hit/miss determination unit 606 of the L3 cache 600 detects that the L3 cache=miss and the entire ways are in use, the hit/miss determination unit 606 selects a replacement object way from the ways in accordance with a replacement policy (for example, LRU or the like). When the cache state of the replacement object way is "modified=1" (the content of the memory and the content of the cache do not match), replacement with write-back operation is requested to the request control unit. The request control unit 601 invalidates the V bit of the object way of the L3 cache AA 602.

Further, in order to maintain coherency between the L2 cache and the L3 cache, the L2 cache holding information 605 is checked. When the V bit is in use in the L2 cache of each core, the invalidation control unit 608 outputs an invalidation request to each core, and the L2 cache invalidation control unit 546 invalidates the V bit of the L2 cache AA 542. Further, the request control unit 601 outputs information such as a command operation code and the address, to the request generation control unit 607 via a signal line. Further, read data of the L3 cache line size of the replacement object way of the L3 cache DA 603 is output. The L3 cache DA 603 outputs the read data to the request generation control unit 607 via a signal line. The request generation control unit 607 generates a request (store) by adding information such as a command operation code, the address, and data, and outputs it to the memory 620 via a signal line.

The memory 620 stores data on the object address for the request (store). With the operation described above, a free space for 1 way is acquired in the L3 cache 620, and the replacement is completed.

After this, operation is performed as general L3 cache miss (equivalent to the case 3). The request control unit outputs a request to the request generation control unit 607 via a signal line 610. The request generation control unit 607 generates a request (load) by adding information such as the command operation code and the address, and outputs it to the memory 620 via a signal line. In the L2 cache holding information 605, information of the core number from which a reply is to be returned, and the way number to which the reply is to be registered of the L2 cache, is stored. Operation subsequent to the memory is the same as the operation in the case 3.

<Operation for Store Command>

The command control unit 501 issues a store command to the request control unit 521 via a signal line. The request control unit 521 outputs the address of the store command to the L1 cache AA 522, the L2 cache AA 542, and the hit/miss determination unit 525 via a signal line. The L1 cache AA 522 and the L2 cache AA 542 output the tag address and the V bit, registered with use of the index address, to the hit/miss determination unit 525 via a signal line.

The hit/miss determination unit 525 performs hit/miss determination with use of information of both the L1 cache and the L2 cache and the address of the store command. In the present invention, in addition to the hit/miss determination of each cache, final hit/miss determination is performed in combination of the hit/miss determination of the L1 cache and the L2 cache. FIG. 9 is a table illustrating hit/miss determination of respective caches and operation of respective caches in the present invention. There are six types of cases, each of which will be described.

Case 1 (L1 cache=hit, L2 cache=hit, L3 cache=hit)

The hit/miss determination unit 525 of the L1 cache 520 determines that the L1 cache=hit. The hit/miss determination unit 525 requests, via a signal line, the request control unit 521 for outputting of a request, and execution of a store command to the L1 cache DA 523 because the L1 cache=hit. The request control unit 521 outputs a request to the request generation control unit 526 via a signal line. Further, the request control unit 521 notifies the L1 cache DA 523 of the address of the store command and the data, via a signal line. The L1 cache DA 523 updates the stored data by using the notified address and the data. The request generation control unit 526 generates a request by adding information such as a command operation code, the address, data, and the L2 cache=hit, and outputs it to the request control unit 541 of the L2 cache 540 via a signal line.

The request control unit 541 of the L2 cache 540 interprets the information added to the request, and outputs a request to the request generation control unit 545 via a signal line for the store command. Further, as it is a store command of the L2 cache=hit, the address and the data are notified to the L2 cache DA 543 via a signal line. The L2 cache DA 543 updates the stored data by using the notified address and the data. The request generation control unit 545 generates a request by adding information such as the command operation code, the address, and data, and outputs it to the request control unit 601 of the L3 cache 600 via a signal line.

The request control unit 601 of the L3 cache 600 interprets the information added to the request, and outputs information such as the operation code and the address to the L3 cache AA 602 and the hit/miss determination unit 606 via a signal line. The L3 cache AA 602 outputs the tag address, the V bit, and the cache state, registered with use of the index address, to the hit/miss determination unit 606 via a signal line. The hit/miss determination unit 606 of the L3 cache determines that the L3 cache=hit. The hit/miss determination unit 606 requests the request control unit 601 for execution of the store command to the L3 cache DA 603 because the L3 cache=hit.

The request control unit 601 notifies the L3 cache AA 602 and the L3 cache DA 603 of the address of the store command, the data, and the hit way, via a signal line. Further, the request control unit 601 outputs the address of the store command and the core number, and requests checking of the L2 cache holding information 605. The L3 cache AA 602 updates the cache state of the hit way to "modified=1". The L3 cache DA 603 updates the stored data by using the notified address and the data. The L2 cache holding information 605 is output to the invalidation control unit 608 via a signal line. When the corresponding data is held by a core other than the core that requested the store command (in this example, it is assumed that the corresponding data is held by the core n), the invalidation control unit 608 outputs a request for invalidation of the L2 cache to the L2 cache invalidation control unit (not illustrated) of the core n (n500) via a signal line.

The L2 cache invalidation control unit of the core n uses the index address and the way information to invalidate the V bit of the L2 cache address array (not illustrated) of the core n via a signal line. With the invalidation operation described above, when the core n accesses the corresponding data with the load command, the L1 cache=hit or miss, and the L2 cache=miss. Therefore, the request of the load command is output up to the L3 cache. Accordingly, cache coherency can be maintained.

Case 2 (L1 cache=hit, L2 cache=miss, L3 cache=hit)

The hit/miss determination unit 525 of the L1 cache 520 determines that the L1 cache=miss. The hit/miss determination unit 525 requests, via a signal line, the request control unit 521 to output a request. The request control unit 521 outputs a request to the request generation control unit 526 via a signal line. The request generation control unit 526 generates a request by adding information such as a command operation code, the address, data, and the L2 cache=miss, and outputs it to the request control unit 541 of the L2 cache 540.

The request control unit 541 of the L2 cache 540 interprets the information added to the request, and outputs a request to the request generation control unit 545 via a signal line for the store command. The request generation control unit 545 generates a request by adding information such as the command operation code, the address, and the data, and outputs it to the request control unit 601 of the L3 cache 600 via a signal line. Operation subsequent to the L3 cache is the same as the operation in the case 1.

Case 3 (L1 cache=hit, L2 cache=miss, L3 cache=miss)

Operation of the L1 cache 520 is miss determination. Therefore, it is the same as the operation in the case 2.

Operation of the L2 cache 540 is miss determination. Therefore, it is the same as the operation in the case 2.

The request control unit 601 of the L3 cache 600 interprets the information added to the request, and outputs information such as the command operation code and the address to the L3 cache AA 602 and the hit/miss determination unit 606 via a signal line. The L3 cache AA 602 outputs the tag address, the V bit, and the cache state, registered with use of the index address, to the hit/miss determination unit 606 via a signal line. The hit/miss determination unit 606 of the L3 cache 600 determines that L3 cache=miss and that there is a free way. The hit/miss determination unit 606 requests the request control unit 601 to output a request for memory read because the L3 cache=miss. The request control unit 601 outputs a request to the request generation control unit 607 via a signal line. The request generation control unit 607 generates a request (load) by adding information such as the command operation code and the address, and outputs it to the memory 620 via a signal line.

The memory 620 outputs reply data of the target address via a signal line for a request (load).

In the L3 cache 600, reply data from the memory 620 is stored in the L3 cache DA 603, and when information representing the final element of the data of the line size is received, the V bit of the L3 cache AA 602 is validated. Further, when the V bit of the L3 cache AA 602 is validated, the request control unit 601 notifies the L3 cache AA 602 and the L3 cache DA 603 of the address of the store command, the data, and the updated way, via a signal line. The L3 cache AA 602 updates the cache state of the updated way to "modified=1". The L3 cache DA 603 updates the stored data by using the notified address and the data.

Case 4 (L1 cache=miss, L2 cache=hit, L3 cache=hit)

Operation of the L1 cache 520 is miss determination. Therefore, it is the same as the operation in the case 2.

Operation of the L2 cache 540 is hit determination. Therefore, it is the same as the operation in the case 1.

Operation of the L3 cache 600 is hit determination. Therefore, it is the same as the operation in the case 1.

Case 5 (L1 cache=miss, L2 cache=miss, L3 cache=hit)

Operation of the L1 cache 520 is miss determination. Therefore, it is the same as the operation in the case 2.

Operation of the L2 cache 540 is miss determination. Therefore, it is the same as the operation in the case 2.

Operation of the L3 cache 600 is hit determination. Therefore, it is the same as the operation in the case 1.

Case 6 (L1 cache=miss, L2 cache=miss, L3 cache=miss)

Operation of the L1 cache 520 is miss determination. Therefore, it is the same as the operation in the case 2.

Operation of the L2 cache 540 is miss determination. Therefore, it is the same as the operation in the case 2.

Operation of the L3 cache 600 is miss determination. Therefore, it is the same as the operation in the case 3.

FIG. 10 illustrates operations in the case of a technology compared with the present invention, as a reference. In this example, there are four types of cases.

As an operation of a case other than the cases described above, there is an operation in the case where the entire ways are in use when the L3 cache=miss and replacement of valid data is required. However, it is the same as a typical write-back cache operation and is not unique to the present invention. Therefore, the description is simplified.

Case 7 (no write-back operation)

Operations of the L1 cache 520 and the L2 cache 540 follow the respective operations of hit/miss described above.

The request control unit 601 of the L3 cache 600 interprets the information added to the request, and outputs information such as the command operation code and the address to the L3 cache AA 602 and the hit/miss determination unit 606 via a signal line. The L3 cache AA 602 outputs the tag address, the V bit, and the cache state, registered with use of the index address, to the hit/miss determination unit 606 via a signal line. When the hit/miss determination unit 606 of the L3 cache detects that the L3 cache=miss and the entire ways are in use, the hit/miss determination unit 606 selects a replacement object way from the ways in accordance with the replacement policy (for example, LRU or the like). When the cache state of the replacement object way is "modified=0" (the content of the memory and the content of the cache match), replacement with no write-back operation is requested to the request control unit 601. The request control unit 601 invalidates the V bit of the object way of the L3 cache AA 602. Further, in order to maintain coherency between the L2 cache and the L3 cache, the L2 cache holding information 605 is checked. When the V bit is used in the L2 cache of each core, the invalidation control unit 608 outputs an invalidation request to each core, and the L2 cache invalidation control unit 546 invalidates the V bit of the L2 cache AA 542.

With the operation described above, a free space for 1 way is acquired, and the replacement is completed. After this, operation is performed as general L3 cache miss (equivalent to the case 3). The request control unit 601 of the L3 cache 600 interprets the information added to the request, and outputs information such as the operation code and the address to the L3 cache AA 602 and the hit/miss determination unit 606 via a signal line. The L3 cache AA 602 outputs the tag address, the V bit, and the cache state, registered with use of the index address, to the hit/miss determination unit 606 via a signal line. The hit/miss determination unit 606 of the L3 cache 600 determines that L3 cache=miss and that there is a free way. The hit/miss determination unit 606 requests the request control unit 601 to output a request for memory read because the L3 cache=miss. The request control unit 601 outputs a request to the request generation control unit 607 via a signal line. The request generation control unit 607 generates a request (load) by adding information such as the command operation code and the address, and outputs it to the memory 620 via a signal line. Operation subsequent to the memory is the same as the operation in the case 3.

Case 8 (with write-back operation)

Operations of the L1 cache 520 and the L2 cache 540 follow the respective operations of hit/miss described above.

The request control unit 601 of the L3 cache 600 interprets the information added to the request, and outputs information such as the command operation code and the address to the L3 cache AA 602 and the hit/miss determination unit 606 via a signal line. The L3 cache AA 602 outputs the tag address, the V bit, and the cache state, registered with use of the index address, to the hit/miss determination unit 606 via a signal line. When the hit/miss determination unit 606 of the L3 cache detects that the L3 cache=miss and the entire ways are in use, the hit/miss determination unit 606 selects a replacement object way from the ways according to the replacement policy (for example, LRU or the like). When the cache state of the replacement object way is "modified=1" (the content of the memory and the content of the cache do not match), replacement with write-back operation is requested to the request control unit 601.

The request control unit 601 invalidates the V bit of the object way of the L3 cache AA 602. Further, in order to maintain coherency between the L2 cache and the L3 cache, the L2 cache holding information 605 is checked. When the V bit is in use in the L2 cache of each core, the invalidation control unit 608 outputs an invalidation request to each core, and the L2 cache invalidation control unit 546 invalidates the V bit of the L2 cache AA 542. Further, the request control unit 601 outputs information such as a command operation code and the address, to the request generation control unit 607 via a signal line. Further, read data of the L3 cache line size of the replacement object way of the L3 cache DA 603 is output. The L3 cache DA 603 outputs the read data to the request generation control unit 607 via a signal line. The request generation control unit 607 generates a request (store) by adding information such as a command operation code, the address, and data, and outputs it to the memory 620 via a signal line. The memory 620 stores data on the object address for the request (store).

With the operation described above, a free space for 1 way is acquired, and the replacement is completed. After this, operation is performed as general L3 cache miss (equivalent to the case 3). The request control unit 601 of the L3 cache 600 interprets the information added to the request, and outputs information such as the operation code and the address to the L3 cache AA 602 and the hit/miss determination unit 606 via a signal line. The L3 cache AA 602 outputs the tag address, the V bit, and the cache state, registered with use of the index address, to the hit/miss determination unit 606 via a signal line. The hit/miss determination unit 606 of the L3 cache 600 determines that L3 cache=miss and that there is a free way. The hit/miss determination unit 606 requests the request control unit 601 to output a request for memory read because the L3 cache=miss. The request control unit 601 outputs a request to the request generation control unit 607 via a signal line. The request generation control unit 607 generates a request (load) by adding information such as the command operation code and the address, and outputs it to the memory 620 via a signal line. Operation subsequent to the memory is the same as the operation in the case 3.

As described above, the present invention has advantageous effects as described below. In a processor having a hierarchical cache memory, in the case of realizing an inclusive cache in which a relationship that the data of a higher-order cache is included in a lower-order cache is established, the inclusive relationship between the higher-order cache and the lower-order cache can be maintained by performing hit/miss determination using the states of both the higher-order cache and the lower-order cache. Thereby, it is not necessary to incorporate an invalidation control circuit for the higher-order cache.

A specific circuit reduction effect will be calculated. In the case of "L1 cache: capacity=64 KB, 4-way set associative, line size=64 KB", when incorporating a copy of the L1 cache AA as invalidation control dedicated to the L1 cache, it is possible to reduce a storage region of (24 bits (tag address)+1 bit (V bit))×256 (index)×4 (way)=35840 bits. Further, in the vector processor, assuming that invalidation control is performed simultaneously in parallel, if 8~32 pieces are executed in parallel, it is possible to reduce a larger storage region such as 35840×8~32=280 K~120 K bits.

While an exemplary cache configuration is described in the present embodiment, the capacities, the number of ways, the line size, the policy when executing a write command (write-through system, write-back system), the allocation system at the time of store command cache miss (with or without allocation), and the like of the L1 cache, the L2 cache, and the L3 cache can be configured freely without any limitations, if cache control circuits are mounted appropriately. As a method of maintaining coherency between the L2 cache and the L3 cache, a method other than the directory method, such as a snoop method, may be used.

Further, as a hierarchical cache, it is only necessary to have a cache in two or more levels of hierarchy. In the present embodiment, explanation has been given on the three-level hierarchical cache configuration. However, a two-level hierarchical cache configuration including the L1 caches 151 and 161 and the L2 caches 152 and 162 as illustrated in FIG. 11, without the L3 cache, is also acceptable. Further, it is also possible to have a cache configuration of four or more levels of hierarchy including a L4 cache, for example.

Further, the number of cores can be freely configured from one to n pieces without any limitations. When there is only one core, coherency control by a store command of another core is not required. However, in a configuration in which the number of ways of the L3 cache is smaller than the number of ways of the L2 cache, when invalidation of the L2 cache occurs due to occurrence of replacement of the L3 cache, the case where the L1 cache=hit and the L2 cache=miss may be caused. Even a vector processor capable of executing a vector command is mountable, if it has caches similar to those of the present embodiment.

Second Exemplary Embodiment

Figure 12:
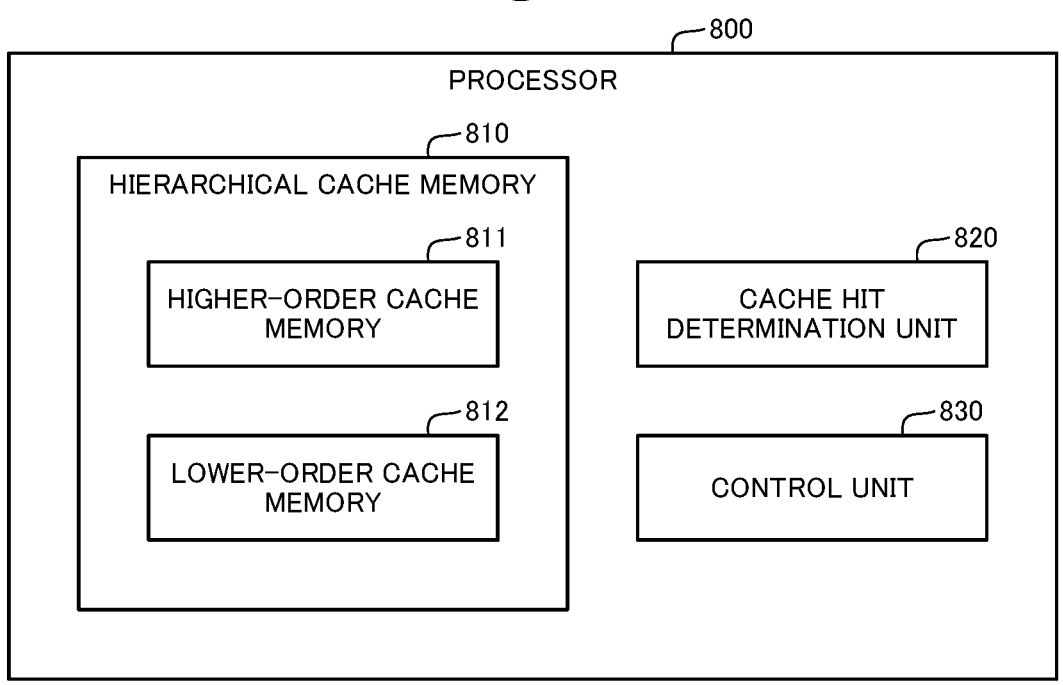
FIG. 12 is a block diagram illustrating a processor according to a second exemplary embodiment of the present invention.

Next, a second exemplary embodiment of the present invention will be described with reference to FIG. 12. FIG. 12 is a block diagram illustrating a configuration of a processor according to the second exemplary embodiment.

It should be noted that the processor of the present embodiment shows the schematic configuration of the processor described in the first exemplary embodiment.

A processor 800 according to the present embodiment includes a hierarchical cache memory 810 having a higher-order cache memory 811 and a lower-order cache memory 812. The hierarchical cache memory 810 is in an inclusive state in which data stored in the higher-order cache memory is included in the lower-order cache memory. The processor 800 also includes a cache hit determination unit 820 configured to determine a cache hit/miss with respect to the higher-order cache memory 811 and the lower-order cache memory 812 at the time of accessing predetermined data, and a control unit 830 configured to perform control to realize the inclusive state, based on determination results of the cache hit/miss with respect to the higher-order cache memory 811 and the lower-order cache memory 812.

It should be noted that the cache hit determination unit 820 and the control unit 830 constitute a cache memory control device which may be mounted in the hierarchical cache memory 810 or provided outside the hierarchical cache memory 810. The cache hit determination unit 820 and the control unit 830 are constructed by execution of a program in an arithmetic unit.

According to the processor having the aforementioned configuration, at the time of accessing predetermined data, first, the cache hit determination unit 820 determines a cache hit/miss with respect to the higher-order cache memory 811 and the lower-order cache memory 812. Then, the control unit 830 performs control to allow the higher-order cache memory 811 and the lower-order cache memory 812 to be in the inclusive state, based on determination results of the cache hit/miss with respect to the higher-order cache memory 811 and the lower-order memory 812.

Thereby, in the present invention, determination of a cache hit/miss is performed using states of both the higher-order cache and the lower-order cache. Accordingly, the inclusive relationship between the higher-order cache and the lower-order cache can be maintained. Thereby, it is not necessary to have an invalidation control circuit for the higher-order cache, so that it is possible to suppress an increase in the number of circuits and complication of control.

<Supplementary Notes>

The whole or part of the exemplary embodiments disclosed above can be described as, but not limited to, the following supplementary notes. Hereinafter, the outlines of the configurations of a processor, a cache memory control device, a program, and a cache memory control method according to the present invention will be described. However, the present invention is not limited to the configurations described below.

(Supplementary Note 1)

A processor comprising:

a hierarchical cache memory having a higher-order cache memory and a lower-order cache memory, the hierarchical cache memory being in an inclusive state in which data stored in the higher-order cache memory is included in the lower-order cache memory;

a cache hit determination unit configured to determine a cache hit or a cache miss with respect to the higher-order cache memory and the lower-order cache memory at a time of accessing predetermined data; and a control unit configured to perform control to realize the inclusive state, based on determination results of the cache hit or the cache miss with respect to the higher-order cache memory and the lower-order cache memory.

(Supplementary Note 2)

The processor according to supplementary note 1, wherein the cache hit determination unit determines that a cache miss occurs in the higher-order cache memory when a cache miss occurs in the lower-order cache memory.

(Supplementary Note 3)

The processor according to supplementary note 2, wherein when a cache miss occurs in the lower-order cache memory, the cache hit determination unit determines that a cache miss occurs in the higher-order cache memory even though a cache hit occurs in the higher-order cache memory.

(Supplementary Note 4)

The processor according to any of supplementary notes 1 to 3, wherein when it is determined that a cache miss occurs in the higher-order cache memory and in the lower-order cache memory, the control unit performs control to allow the higher-order cache memory and the lower-order cache memory to be in the inclusive state by using data stored in a memory still lower than the lower-order cache memory.

(Supplementary Note 5)

The processor according to any of supplementary notes 1 to 4, wherein when it is determined that a cache miss occurs in the higher-order cache memory and a cache hit occurs in the lower-order cache memory, the control unit performs control to realize the inclusive state by storing data, stored in the lower-order cache memory, in the higher-order cache memory.

(Supplementary Note 6)

The processor according to any of supplementary notes 1 to 5, further comprising an invalidation unit configured to invalidate data stored in the lower-order cache memory, without having a unit configured to invalidate data stored in the higher-order cache memory.

(Supplementary Note 7)

The processor according to any of supplementary notes 1 to 6, wherein the higher-order cache memory includes the cache hit determination unit configured to determine a cache hit or a cache miss with respect to the higher-order cache memory and the lower-order cache memory.

(Supplementary Note 8)

A cache memory control device configured to control a hierarchical cache memory having a higher-order cache memory and a lower-order cache memory to realize an inclusive state in which data stored in the higher-order cache memory is included in the lower-order cache memory, the device comprising:

a cache hit determination unit configured to determine a cache hit or a cache miss with respect to the higher-order cache memory and the lower-order cache memory at a time of accessing predetermined data; and a control unit configured to perform control to realize the inclusive state in the higher-order cache memory and the lower-order cache memory, based on determination results of the cache hit or the cache miss with respect to the higher-order cache memory and the lower-order cache memory.

(Supplementary Note 9)

A non-transitory computer-readable medium storing a program comprising instructions for causing a cache memory control device to realize, the cache memory control device being configured to control a hierarchical cache memory having a higher-order cache memory and a lower-order cache memory to realize an inclusive state in which data stored in the higher-order cache memory is included in the lower-order cache memory:

a cache hit determination unit configured to determine a cache hit/miss with respect to the higher-order cache memory and the lower-order cache memory at a time of accessing predetermined data; and a control unit configured to perform control to realize the inclusive state in the higher-order cache memory and the lower-order cache memory, based on determination results of the cache hit/miss with respect to the higher-order cache memory and the lower-order cache memory.

(Supplementary Note 9.1)

The non-transitory computer-readable medium storing the program according to supplementary note 9, wherein the cache hit determination unit determines that a cache miss occurs in the higher-order cache memory when a cache miss occurs in the lower-order cache memory.

(Supplementary Note 9.2)

The non-transitory computer-readable medium storing the program according to supplementary note 9.1, wherein when a cache miss occurs in the lower-order cache memory, the cache hit determination unit determines that a cache miss occurs in the higher-order cache memory even though a cache hit occurs in the higher-order cache memory.

(Supplementary Note 9.3)

The non-transitory computer-readable medium storing the program according to any of supplementary notes 9 to 9.2, wherein when it is determined that a cache miss occurs in the higher-order cache memory and in the lower-order cache memory, the control unit performs control to allow the higher-order cache memory and the lower-order cache memory to be in the inclusive state by using data stored in a memory still lower than the lower-order cache memory.

(Supplementary Note 9.4)

The non-transitory computer-readable medium storing the program according to any of supplementary notes 9 to 9.3, wherein when it is determined that a cache miss occurs in the higher-order cache memory and a cache hit occurs in the lower-order cache memory, the control unit performs control to realize the inclusive state by storing data, stored in the lower-order cache memory, in the higher-order cache memory.

(Supplementary Note 10)

A cache memory control method performed by a processor including a hierarchical cache memory having a higher-order cache memory and a lower-order cache memory, the hierarchical cache memory being in an inclusive state in which data stored in the higher-order cache memory is included in the lower-order cache memory, the method comprising:

determining a cache hit or a cache miss with respect to the higher-order cache memory and the lower-order cache memory at a time of accessing predetermined data; and performing control to realize the inclusive state, based on determination results of the cache hit or the cache miss with respect to the higher-order cache memory and the lower-order cache memory.

(Supplementary Note 11)

The cache memory control method according to supplementary note 10, further comprising determining that a cache miss occurs in the higher-order cache memory when a cache miss occurs in the lower-order cache memory.

(Supplementary Note 12)

The cache memory control method according to supplementary note 11, further comprising when a cache miss occurs in the lower-order cache memory, determining that a cache miss occurs in the higher-order cache memory even though a cache hit occurs in the higher-order cache memory.

(Supplementary Note 13)

The cache memory control method according to any of supplementary notes 10 to 12, further comprising when it is determined that a cache miss occurs in the higher-order cache memory and the lower-order cache memory, performing control to allow the higher-order cache memory and the lower-order cache memory to be in the inclusive state by using data stored in a memory still lower than the lower-order cache memory.

(Supplementary Note 14)

The cache memory control method according to any of supplementary notes 10 to 13, further comprising when it is determined that a cache miss occurs in the higher-order cache memory and a cache hit occurs in the lower-order cache memory, performing control to realize the inclusive state by storing data, stored in the lower-order cache memory, in the higher-order cache memory.

The program described above may be stored in a storage device or on a computer-readable storage medium. For example, a storage medium is a portable medium such as a flexible disk, an optical disk, a magneto-optical disk, a semiconductor memory, or the like.

While the present invention has been described with reference to the exemplary embodiments described above, the present invention is not limited to the above-described embodiments. The form and details of the present invention can be changed within the scope of the present invention in various manners that can be understood by those skilled in the art.

REFERENCE SIGNS LIST

100, 110 core
101, 111 L1 cache
102, 112 L2 cache
120 L3 cache
130 memory
150, 160 core
151, 161 L1 cache
152, 162 L2 cache
170 memory
200, n200 core
201 command control unit
202 arithmetic control unit
220 L1 cache
221 request control unit
222 L1 cache address array
223 L1 cache address array copy
224 L1 cache data array
225 reply control unit
226 hit/miss determination unit
227 request generation control unit
228 L1 cache invalidation control unit
240 L2 cache
241 request control unit
242 L2 cache address array
243 L2 cache data array
244 reply control unit
245 hit/miss determination unit
246 request generation control unit 247 L2 cache invalidation control unit
300 L3 cache
301 request control unit
302 L3 cache address array
303 L3 cache data array
304 reply control unit
305 L2 cache holding information
306 hit/miss determination unit
307 request generation control unit
308 invalidation control unit
320 memory
500, n500 core
501 command control unit
502 arithmetic control unit
520 L1 cache
521 request control unit
522 L1 cache address array
523 L1 cache data array
524 reply control unit
525 hit/miss determination unit
526 request generation control unit
540 L2 cache
541 request control unit
542 L2 cache address array
543 L2 cache data array
544 reply control unit
545 request generation control unit
546 L2 cache invalidation control unit
600 L3 cache
601 request control unit
602 L3 cache address array
603 L3 cache data array
604 reply control unit
605 L2 cache holding information
606 hit/miss determination unit
607 request generation control unit
608 invalidation control unit
620 memory
800 processor
810 hierarchical cache memory
811 higher-order cache memory
812 lower-order cache memory
820 cache hit determination unit
830 control unit

The invention claimed is:

1. A processor comprising:
a hierarchical cache memory having a higher-order cache memory and a lower-order cache memory, the hierarchical cache memory being in an inclusive state in which data stored in the higher-order cache memory is included in the lower-order cache memory;
a cache hit determination unit configured to determine a cache hit or a cache miss with respect to the higher-order cache memory and the lower-order cache memory at a time of accessing predetermined data; and
a control unit configured to perform control to realize the inclusive state, based on determination results of the cache hit or the cache miss with respect to the higher-order cache memory and the lower-order cache memory, wherein
the cache hit determination unit searches both the higher-order cache memory and the lower-order cache memory at the time of accessing the predetermined data, and in response to determining that a cache hit has occurred in the higher-order cache memory and a cache miss has occurred in the lower-order cache memory, the cache hit determination unit handles data of the cache hit in the higher-order cache memory as invalid data, and
in response to determining that a cache hit occurred in the higher-order cache memory and a cache miss occurred in the lower-order cache memory, the control unit performs control to realize the inclusive state by storing data, stored in a memory still lower than the lower-order cache memory, in the higher-order cache memory and in the lower-order cache memory.

2. The processor according to claim 1, wherein
in response to determining that a cache miss occurred in the higher-order cache memory and a cache hit occurred in the lower-order cache memory, the control unit performs control to realize the inclusive state by storing data, stored in the lower-order cache memory, in the higher-order cache memory.

3. The processor according to claim 1, further comprising
an invalidation unit configured to invalidate data stored in the lower-order cache memory, without having a unit configured to invalidate data stored in the higher-order cache memory.

4. The processor according to claim 1, wherein
the higher-order cache memory includes the cache hit determination unit configured to determine a cache hit or a cache miss with respect to the higher-order cache memory and the lower-order cache memory.

5. A cache memory control device configured to control a hierarchical cache memory having a higher-order cache memory and a lower-order cache memory to realize an inclusive state in which data stored in the higher-order cache memory is included in the lower-order cache memory, the cache memory control device comprising:
a cache hit determination unit configured to determine a cache hit or a cache miss with respect to the higher-order cache memory and the lower-order cache memory at a time of accessing predetermined data; and
a control unit configured to perform control to realize the inclusive state in the higher-order cache memory and the lower-order cache memory, based on determination results of the cache hit or the cache miss with respect to the higher-order cache memory and the lower-order cache memory, wherein
the cache hit determination unit searches both the higher-order cache memory and the lower-order cache memory at the time of accessing the predetermined data, and in response to determining that a cache hit has occurred in the higher-order cache memory and a cache miss has occurred in the lower-order cache memory, the cache hit determination unit handles data of the cache hit in the higher-order cache memory as invalid data, and
in response to determining that a cache hit occurred in the higher-order cache memory and a cache miss occurred in the lower-order cache memory, the control unit performs control to realize the inclusive state by storing data, stored in a memory still lower than the lower-order cache memory, in the higher-order cache memory and in the lower-order cache memory.

6. The cache memory control device according to claim 5, wherein
in response to determining that a cache miss occurred in the higher-order cache memory and a cache hit occurs in the lower-order cache memory, the control unit performs control to realize the inclusive state by storing data, stored in the lower-order cache memory, in the higher-order cache memory.

7. A cache memory control method performed by a processor including a hierarchical cache memory having a higher-order cache memory and a lower-order cache memory, the hierarchical cache memory being in an inclusive state in which data stored in the higher-order cache memory is included in the lower-order cache memory, the method comprising:

determining a cache hit or a cache miss with respect to the higher-order cache memory and the lower-order cache memory at a time of accessing predetermined data;

performing control to realize the inclusive state, based on determination results of the cache hit or the cache miss with respect to the higher-order cache memory and the lower-order cache memory;

searching both the higher-order cache memory and the lower-order cache memory at the time of accessing the predetermined data, and in response to determining that a cache hit has occurred in the higher-order cache memory and a cache miss has occurred in the lower-order cache memory, handling data of the cache hit in the higher-order cache memory as invalid data, and in response to determining that a cache hit occurred in the higher-order cache memory and a cache miss occurred in the lower-order cache memory, performing control to realize the inclusive state by storing data, stored in a memory still lower than the lower-order cache memory, in the higher-order cache memory and in the lower-order cache memory.

* * * * *